United States Patent [19]

Shaffer et al.

[11] Patent Number: 5,149,398

[45] Date of Patent: Sep. 22, 1992

[54] APPARATUS FOR PRODUCING A FAST DISSOLVING GRANULAR PRODUCT

[75] Inventors: John H. Shaffer, Cleveland; William L. Kurtz, Chattanooga; John H. Hubbard, Cleveland, all of Tenn.

[73] Assignee: Olin Corporation, Cheshire, Conn.

[21] Appl. No.: 632,724

[22] Filed: Dec. 24, 1990

Related U.S. Application Data

[62] Division of Ser. No. 353,571, May 18, 1989, Pat. No. 5,085,847.

[51] Int. Cl.⁵ .............................. B01D 1/18
[52] U.S. Cl. .................... 159/4.01; 159/4.04; 159/4.09; 159/48.1; 34/57 A; 422/187; 423/474
[58] Field of Search ............ 159/4.01, 4.06, 4.09, 159/4.04, 4.02, 48.1; 422/149, 187; 423/473, 474; 252/187.29; 34/57 A; 426/453

[56] References Cited

U.S. PATENT DOCUMENTS

| | | | |
|---|---|---|---|
| 2,314,159 | 3/1943 | Peebles | 159/4.01 |
| 2,901,435 | 8/1959 | Robson | 423/474 |
| 3,110,444 | 11/1963 | Eakins | 159/4.01 |
| 3,519,054 | 7/1970 | Cavataio et al. | 159/4.01 |
| 3,748,103 | 7/1973 | Bean et al. | 159/4.04 |
| 3,895,994 | 7/1975 | Saguchi et al. | 159/4.01 |
| 3,969,546 | 7/1976 | Saeman | 423/474 |
| 4,146,578 | 3/1979 | Brennan et al. | 423/473 |
| 4,147,761 | 4/1979 | Wojtowicz et al. | 423/473 |
| 4,364,917 | 12/1982 | Tiedemann et al. | 423/474 |
| 4,370,198 | 1/1983 | Dencs et al. | 159/4.04 |
| 4,380,491 | 4/1983 | Joy et al. | 159/4.01 |
| 4,490,403 | 12/1984 | Pisecky et al. | 159/4.04 |
| 4,849,201 | 7/1989 | Smith et al. | 423/474 |
| 4,963,226 | 10/1990 | Chamberlain | 159/4.04 |

FOREIGN PATENT DOCUMENTS 196884 10/1986 European Pat. Off. ............ 423/474

*Primary Examiner*—Wilbur Bascomb, Jr.
*Attorney, Agent, or Firm*—Ralph D'Alessandro

[57] ABSTRACT

A process and apparatus utilizing the process of the present invention are provided to produce a fast dissolving, thermally sensitive granular product. The process employs a fluidized spray dryer having a fluidized bed of granular particles into which recycled off-sized product is fed after being agglomerated to adjust particle size. The spray dryer optionally can employ a second nozzle positioned above the fluidized bed. The process can be employed in the production of calcium hypochlorite water sanitizing chemical wherein the chlorine is supplied from a hypochlorous acid reactor and lime hypochlorinator.

14 Claims, 2 Drawing Sheets

APPARATUS FOR PRODUCING A FAST DISSOLVING GRANULAR PRODUCT

This application is a division of application Ser. No. 07/353,571, filed May 18, 1989 now U.S. Pat. No. 5,085,847.

BACKGROUND OF THE INVENTION

This invention relates generally to apparatus used to produce a water sanitizing product containing a halogen compound. More specifically, the improved apparatus relates to the design of a spray dryer and its use in combination with a fluid bed dryer and agglomerating apparatus to produce fast dissolving granular product, such as bleaching and sanitizing agents for body of water like calcium hypochlorite.

Bleaching and sanitizing agents for use in bodies of water, particularly in the sanitation and disinfection of swimming pool waters, have been commercially utilized for a number of years. Calcium hypochlorite has been a particularly effective agent because of its relative stability and its being an inexpensive solid oxidizing agent that uses its available chlorine to remove impurities and kill pathogenic organisms in water.

Calcium hypochlorite has been manufactured or proposed for manufacture from lime and sodium hydroxide by a number of processes that attempt to produce the highest quality product that is contaminate free in the most cost effective manner. Exemplary of these different processes are the use of a slurry containing crystals of calcium hypochlorite dihydrate in a concentrated aqueous solution of calcium hypochlorite and sodium chloride, or other inorganic halides, or the admixing of a wet cake of calcium hypochlorite in a cutting type mixer with dry fines in sufficient proportion to decrease water content to the desired level. U.S. patent application Ser. No. 898,841, filed Aug. 19, 1986 by Bridges, now abandoned and assigned to the assignee of the present invention, discloses a process to produce calcium hypochlorite particles with the use of a turbine agglomerator. Still another approach was developed using spray graining techniques to produce the desired product granules by the spraying and drying of calcium hypochlorite slurries.

Most recently, a process producing a hypochlorinated acid by the mixing and reaction of an alkali metal hydroxide and a chlorine gas has been perfected to provide the chlorinating agent that can be used to produce calcium hypochlorite.

There has been a continuing need to develop a fast dissolving granular product that is dust free and, especially in the area of swimming pool chemical product manufacture, that permits longer operating times of the equipment without the need for maintenance because of the corrosive nature of the product and the reactants employed. Similarly, the nature of the product produced in swimming pool chemical product manufacture requires ease of handling.

Previous processes, and the apparatus employed in these processes, have suffered from not achieving substantially complete reactions between the halogen and the alkali metal hydroxide, or have produced product that has not been sufficiently dry to facilitate handling. The sizing of the particles has been a continuing problem since oversized particles contain excessive moisture so that caking results and the caked mass adheres to apparatus surfaces, increasing the maintenance time required and causing damage to equipment. Alternately where a drier product was obtained, the final product produced by previous processes had excessive dust which resulted in loss of desired product and disintegration of products into difficult to handle and aesthetically unattractive product masses for consumers.

These problems are solved by the present invention wherein improved apparatus and a process are employed to produce a fast dissolving granular product for thermally sensitive materials.

SUMMARY OF THE INVENTION

It is an object of the present invention to provide improved apparatus and an improved process which produce a fast dissolving granular product that is easy to handle and relatively dust free.

It is another object of the present invention to provide apparatus in a process which reduces the maintenance time needed and maximizes the operating time of the apparatus and the process.

It is a feature of the present invention that an improved fluidized spray dryer is employed that has a second spray nozzle and is positioned to spray product immediately above a fluidized bed in a fluidized bed dryer.

It is another feature of the present invention that the improved spray dryer can be used to control particle size and density.

It is another feature of the present invention that the process employs a turbine agglomerator in conjunction with an offsized product recycle stream and the fluidized spray dryer to obtain on-size product particles with the desired density.

It is still another feature of the present invention that the fast dissolving granular product is produced by single step drying in the process which employs an improved fluidized spray dryer with a fluidized bed that minimizes the amount of dust in the product by forcing the dust to continuously grow in size before leaving the dryer.

It is an advantage of the present invention that a fast dissolving granular product is obtained by a process which ideally will handle thermally sensitive material.

It is another advantage of the present invention that the fluidized spray dryer with the second nozzle can impart new or improved properties to the product by spraying directly onto the fluidized bed. These improved properties can include desired size and density characteristics.

It is another advantage of the present invention that the apparatus employed has longer operating times with less time required for maintenance and less build up of moist, potentially corrosive material on the apparatus.

These and other objects, features, and advantages are provided in the process and the apparatus employed in the process for the production of a fast dissolving granular product, such as a calcium hypochlorite pool chemical, which employs a fluidized bed dryer to apply a spray coating to the product particles in conjunction with a turbine agglomerator.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

What follows is a detailed description of the preferred embodiment of the invention described herein. It should be understood while the invention will be described in context of the process and apparatus used to produce the calcium hypochlorite pool chemical, the apparatus and the process, with minor modifications, could equally well be applied for drying any thermally sensitive material that requires a dust free end product, such as granular chlorinated isocyanurates, coffee, dry milk, or sugar.

Figure 1:
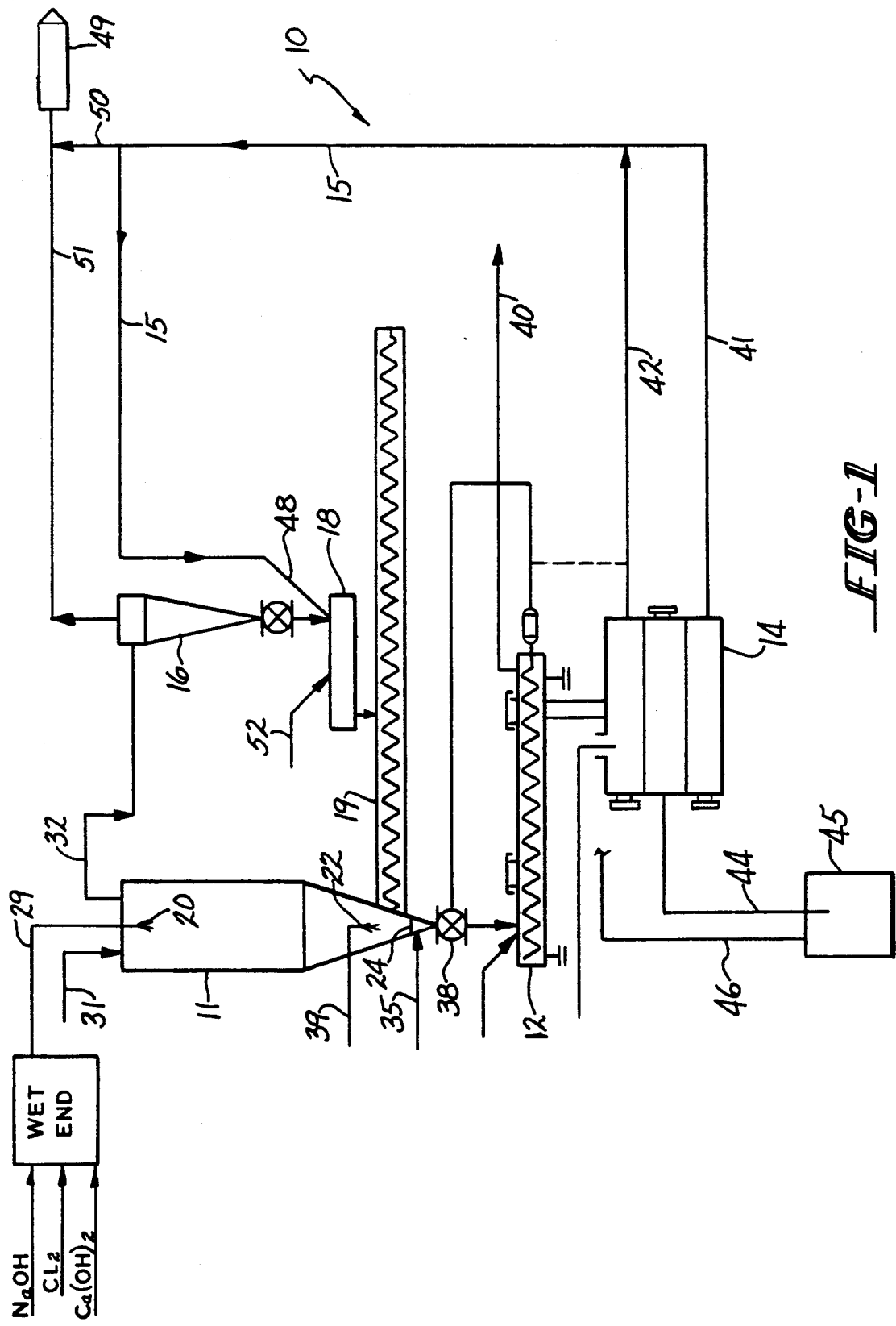
FIG. 1 is a diagrammatic view of the apparatus employed in the process used to produce the on-sized fast dissolving granular product.

FIG. 1 shows a diagrammatic illustration of the process utilized on the dry end to produce the fast dissolving granular product.

The particular calcium hypochlorite process employs a wet end and a dry end, utilizing a reactor 27 to obtain hypochlorous acid that is ultimately liquified in aqueous form to provide the chlorine source to produce the calcium hypochlorite feed in the wet end for the particle size, density, and moisture adjustments accomplished in the dry end. The calcium hypochlorite is produced from hypochlorous acid by the following reactions:

$$NaOH + Cl_2 \rightarrow HOCl + NaCl$$

$$2HOCl + Ca(OH)_2 \rightarrow Ca(OCl)_2 + 2H_2O.$$

The main wet end reaction produces dihydrated calcium hypochlorite from the reaction:

$$2HOCl + Ca(OH)_2 \rightarrow Ca(OCl)_2 \cdot 2H_2O.$$

The principal dry end reaction dries the dihydrated calcium hypochlorite as follows:

$$Ca(OCl)_2 \cdot 2H_2O \rightarrow Ca(OCl)_2 + 2H_2O.$$

The following two secondary reactions occur during the process and should be minimized by controlling the process conditions:

$$3Ca(OCl)_2 \rightarrow Ca(ClO_3)_2 + 2CaCl_2$$

$$2H_2O + Ca(OCl)_2 + CaCl_2 \rightarrow 2Ca(OH)_2 + 2Cl_2$$

The dry end apparatus is indicated generally by the numeral 10 and includes a fluidized spray dryer 11, an auger or screw feed conveyor 12, a screening apparatus 14, a return loop 15, a cyclone separator 16 and a turbine agglomerator 18 that feeds into a fines return conveyor means 19. The fines return conveyor means 19 feeds the turbine agglomerated fines into the bed at the bottom of the fluidized spray dryer bed 11.

Figure 2:
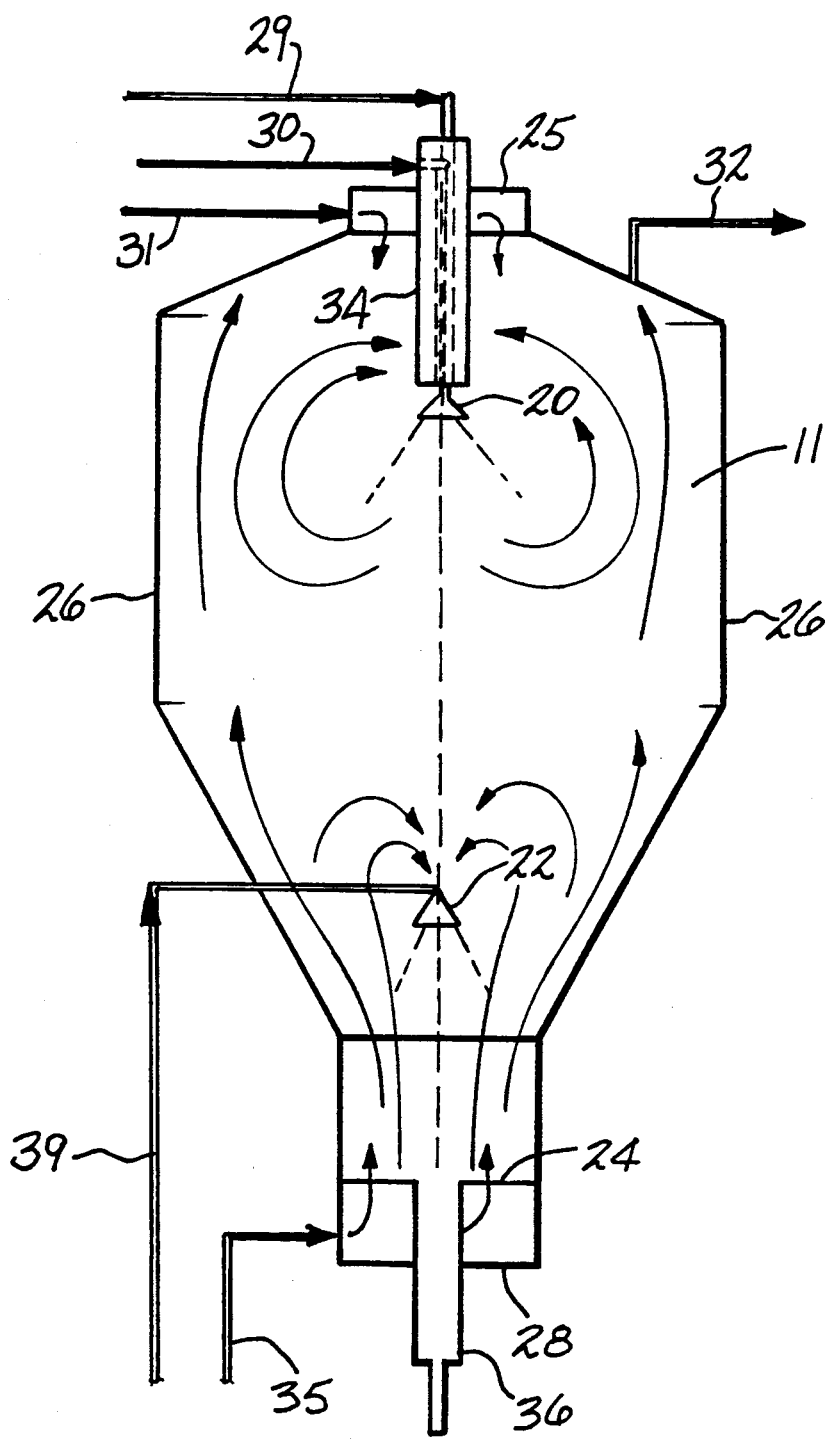
FIG. 2 is an enlarged side elevational view of a fluidized bed dryer showing the employment of a second spraying nozzle immediately over the fluidized bed.

FIG. 2 shows in greater detail the fluidized bed dryer 11 which can employ either a single nozzle 20 or a second nozzle 22 which is positioned immediately over the fluidized bed 24 of granular particles. Dryer 11 is shown in FIG. 2 as having a top 25 through which reactants are fed into the interior of the dryer, side walls 26, and a bottom 28 through which the product particles pass. A slurry of calcium hypochlorite dihydrate, preferably formed from the reaction of hypochlorous acid and lime in lime slurry hypochlorinator 33, is fed into the to 25 of dryer 11 via feedline 29 to be sprayed into the top of the dryer 11 by the two-fluid nozzle 20 or any suitable atomizing apparatus. The majority of the atomized slurried feed, possibly as much as two-thirds, exits dryer 11 as dried powder via an exit air line 32 and is fed to the separation device or cyclone 16 of FIG. 1.

The air is fed in through air line 30 to atomize the calcium hypochlorite slurry. Hot air is fed in through the side of the top via infeed line 31 into a plenum and is diffused by a diffuser plate down into the dryer 11 to be cocurrent with the spray and to surround the spray. This warm air effectively dries the atomized slurry material to a moisture content level of from about 5 to about 15% by weight.

The atomizing airline 30 and the slurried calcium hypochlorite feedline 29 pass through a sleeve 34 that extends from the top of dryer 11 downwardly prior to mixing the air and the calcium hypochlorite upon reaching nozzle 20. At the bottom of the dryer 11 a hot air feedline 35 delivers hot drying air into the fluidized bed 24 of granular particles to fluidize the bed and dry it further to the desired moisture content level of about 6 to about 20 and, more preferably, of about 8 to about 12% by weight in a single process step. This is accomplished by the hot air delivered by feedline 35 blowing dust particles upwardly into the spray of nozzle 20 so these particles increase or grow in size. In this manner the amount of dust produced in the granular product is minimized while producing particle sizes of −20 to +50 mesh size and a percentage by weight of about 79 to about 89% calcium hypochlorite. The product particles exit the spray dryer through a chute 36 that connects to a metering air lock rotary valve 38 seen in FIG. 1. Approximately one-third of the slurried calcium hypochlorite feed introduced through line 29 drops to the fluidized bed 24 at the bottom of dryer 11.

Where the second nozzle 22 is employed in the dryer 11 having a generally vertical central axis therethrough, it is mounted along the generally vertical central axis, best seen in FIG. 2 by the dotted line, positioned so that it sprays downwardly just above the fluidized bed 24. Nozzle 22 is provided with its liquid by infeed line 39. Nozzle 22 can be used to put a separate coating material on the product particles in the fluidized bed 24 or to further increase the size of the product particles. Infeed line 39 can provide a material, such as a brine spray or an additional slurry of calcium hypochlorite or other compatible liquids, to effect changes in properties and other characteristics of the product particles. The properties affected can be the density where slurried calcium hypochlorite is applied or consumer oriented features, such as chlorine odor or friability, where a separate coating material is applied.

This second nozzle 22 adds liquid with dissolved solids that goes into the interior of the product particles by capillary action which leaves behind solids when the liquid is evaporated in the fluidized bed 24 to give a denser product particle. Dust particles agglomerate on the exterior of the product particles to increase particle size.

As seen in FIG. 1, the product exits the frustoconically shaped bottom of the dryer 11 and passes through the metering airlock rotary valve 38 into the auger conveyor 12. Conveyor 12 carries the product to the screen 14 to separate the off-sized product from the on-sized product. Undersized product can be recycled from conveyor 12 as dust particles via line 40 Conveyor 12 feeds the product particles into screen 14 where oversized particles are separated via oversized particle recycle line 42 and undersized particles are recycled via undersized particle recycle line 41 into return loop 15 for transport to the turbine agglomerator 18. On-size particles are discharged through discharge line 44 into a pack out station 45 which can have a vent line 46 to remove dust to, for example, a solids separation device (not shown). Dust recycle line 40 can similarly remove dust from conveyor 12 to the same solids separation device. The recycled undersized product particles and oversized product particles are passed via return loop 15 into the agglomerator feed chute 48. The recycled material from the agglomerator feed chute is mixed with captured dry material having about 5% moisture from cyclone 16 and is introduced into the turbine agglomerator 18. Dust particles from the recycle loop 15 can pass to scrubber 49 via dust vent line 50 where they are joined by dust particles coming from the cyclone 16 via dust vent line 51.

Agglomerator 18 has a liquid spray, which can be water or a calcium hypochlorite slurry or a calcium hypochlorite filtrate that is fed in via line 52 to spray on the recycled material to obtain approximately a 10–22% moisture content. The agglomerator increases the particle size and density to that desired via crushing, agglomeration, and compaction by rotating paddles that mix the recycled feed material with the liquid. The agglomerated material is returned to the fluidized bed 24 of the dryer 11 via the fines return conveyor 19.

The process stream flow rates for the entire process shown in FIG. 1 can be described within prescribed preferred parameters. The slurry fed in through the calcium hypochlorite feedline 29 can flow from a rate of about 0.4 to about 4.0 gallons per minute while the hot air fed in through feed line 31 can range in temperature from about 250° Centigrade to about 400° Centigrade with a feed rate of about 800 to about 1300 standard cubic feet per minute. Where second nozzle 22 is employed in the dryer 11, the flow rate of the liquid through infeed line 39 can range from about 0.016 to about 0.16 gallons per minute. Hot air fed into the fluidized bed 24 of the dryer 11 can range in temperature from about 95° C. to about 140° C. with a flow rate of about 350 to about 500 standard cubic feet per minute. The liquid fed into liquid feedline 52 to the turbine agglomerator 18 can have a flow rate of about 0.03 to about 0.6 gallons per minute. The recycle loop 15 can have anywhere from about 1 to about 10 tons per day of product particles recycled through it, while the cyclone 16 can receive about 0.67 to about 6.7 tons per day through the air exit line 23 from the dryer 11. The amount of product produced at the packout station 45 can vary from about 1 to about 10 tons per day.

While the preferred structure and process in which the principles of the present invention have been incorporated is shown and described above, it is to be understood that the invention is not to be limited to the particular details presented, but in fact, widely different means and process steps may be employed in the broader aspects of this invention. The scope of the appended claims is intended to encompass all obvious changes in the details, materials and arrangements of parts and process steps which will occur to one in the skill of the art upon reading of the disclosure.

What is claimed is:

1. A generally vertically extending spray dryer with a generally vertical central axis therethrough for use in spray drying a thermally sensitive granular product consisting of the combination of:
   (a) a dryer housing having sidewalls, a top and a bottom;
   (b) a liquid infeed line connected to the dryer housing adjacent the top;
   (c) a gas infeed line connected to the dryer housing adjacent the top;
   (d) a first nozzle within the dryer housing adjacent the top and connected in flow communication with the liquid and gas infeed lines to provide an atomized liquid spray within the dryer housing;
   (e) a drying gas infeed line connected to the housing adjacent the top to feed a drying gas downwardly into contact with the atomized liquid spray to form granular particles;
   (f) a bed adjacent the bottom of the dryer housing for retaining the granular particles, the bed further having an outlet to permit the granular particles to exit the dryer housing;
   (g) a second drying gas infeed line connected to the dryer housing for providing a drying gas adjacent and upwardly in to the bed to dry and fluidize the bed of granular particles and to blow dust particles upwardly; and
   (h) a second nozzle mounted below the first nozzle along the generally vertical central axis of the dryer and just above the fluidized bed of granular particles within the dryer housing for spraying a liquid generally downwardly onto the fluidized bed and the upwardly blown dust particles to cause the dust particles to increase in size and to minimize dust in the bed of granular particles.

2. The apparatus according to claim 1 wherein the drying gas infeed line adjacent the top of the dryer housing feeds the drying gas cocurrently with the direction of spray of the atomized liquid spray.

3. The apparatus according to claim 2 wherein the direction of the spray and the drying gas adjacent the top of the dryer housing is generally downwardly.

4. The apparatus according to claim 1 wherein the sidewalls of the dryer housing are generally cylindrically shaped and have a conically or frustoconically shaped bottom portion connecting the outlet in the bed to the cylindrically shaped sidewalls.

5. The apparatus according to claim 4 wherein the spray dryer is connected to a hypochlorous acid reactor and a lime slurry hypochlorinator to provide slurried calcium hypochlorite to the liquid infeed line.

6. A generally vertically extending spray dryer having a generally vertical central axis therethrough for use in spray drying a thermally sensitive granular product comprising in combination:
   (a) a dryer housing having sidewalls, a top, a bottom and a bed for retaining granular product particles adjacent the bottom;
   (b) infeed means connected to the dryer housing adjacent the top to provide a liquid and a gas in separate flow streams;
   (c) spraying means within the dryer housing aligned along the generally vertical central axis adjacent the top connected in flow communication with the infeed means to provide an atomized liquid spray within the dryer housing by combining the liquid and gas flow streams;

(d) first drying gas infeed means connected to the housing to feed a drying gas flow stream into contact with the atomized liquid spray adjacent the top to form granular product particles;

(e) second drying gas infeed means to feed a second drying gas flow stream upwardly into the bed in the dryer housing adjacent the bottom, the bed having the granular product particles collected therein and being fluidized by the second drying gas flow stream to blow dust particles upwardly;

(f) second spraying means mounted within and along the generally vertical central axis of the dryer housing to spray a liquid generally downwardly onto the bed of granular product particles and the upwardly blown dust particles to cause the dust particles to increase in size and to minimize dust in the bed of granular product particles; and (g) outlet means adjacent the bottom to remove dried granular product particles therethrough.

7. The apparatus according to claim 6 wherein the dryer housing has a gas outlet line adjacent to the top to recycle heated gas, the gas outlet line being connected to a solids separation device.

8. The apparatus according to claim 6 wherein the first drying gas infeed means adjacent the top of the dryer housing feeds the drying gas cocurrently with the direction of spray of the atomized liquid spray.

9. The apparatus according to claim 8 wherein the direction of the spray and the drying gas adjacent the top of the dryer housing is generally downwardly.

10. The apparatus according to claim 9 wherein the sidewalls of the dryer housing are generally cylindrically shaped and have a conically or frustoconically shaped bottom portion connecting the outlet in the bed to the cylindrically shaped sidewalls.

11. The apparatus according to claim 10 wherein the spray dryer is connected to a hypochlorous acid reactor and a lime slurry hypochlorinator to provide slurried calcium hypochlorite as the liquid to the infeed means.

12. The apparatus according to claim 11 wherein the spraying means is a two-fluid nozzle.

13. The apparatus according to claim 12 wherein the infeed means is a gas feed line and a liquid feed line.

14. In a generally vertically extending spray dryer having a generally vertical central axis therethrough for use in spray drying a thermally sensitive granular product, the dryer having a dryer housing with sidewalls, a top, a bottom and a bed for retaining granular product particles adjacent the bottom; means connected to a first nozzle the first nozzle being aligned along the generally vertical central axis and connected to the dryer housing adjacent the top to provide an atomized liquid spray within the dryer housing by combining separate liquid and gas flow streams; first gas flow infeed means to supply a first drying gas stream connected to the dryer housing and cooperative with the first nozzle to discharge the liquid spray into a first drying gas stream; and second gas flow infeed means to create a second drying gas stream to fluidize the bed of granular particles in the bottom of the dryer, the improvement comprising:

a second generally downwardly directed nozzle mounted at a different height than and directly below the first nozzle and along the generally vertical central axis overlying the bed of granular particles containing dust particles therein and adjacent the bottom of the spray dryer to spray a liquid generally downwardly onto the fluidized bed and into dust particles directed upwardly by the second drying gas stream to increase the size of the granular particles in the bed and the dust particles to minimize the amount of dust produced.

* * * * *